May 3, 1966  R. J. PERRONE ETAL  3,249,671
METHOD OF SHRINKING TUBING
Filed May 31, 1963
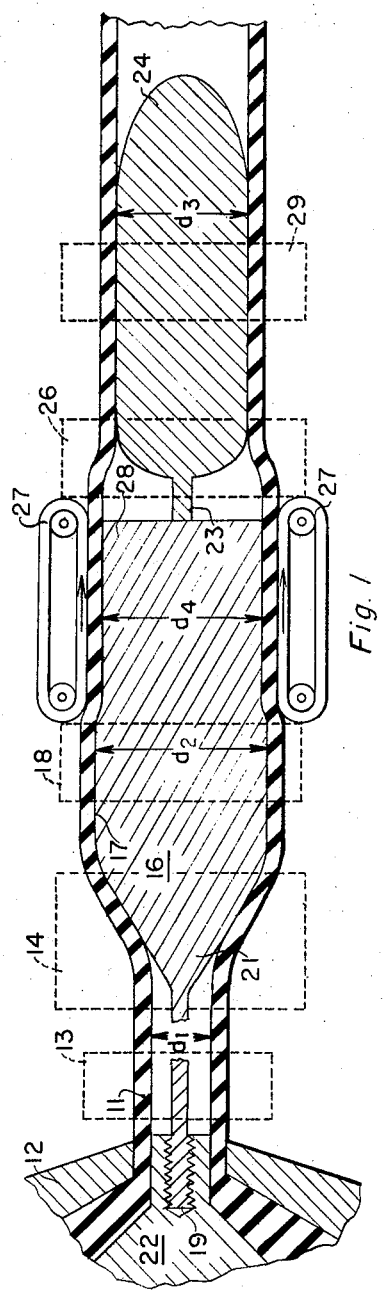
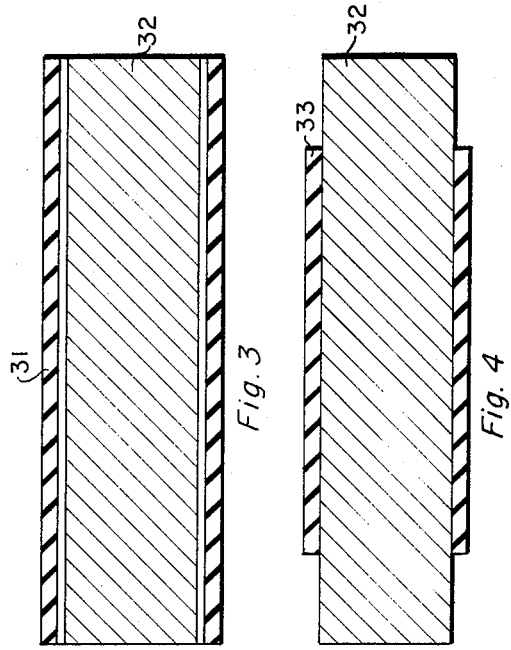
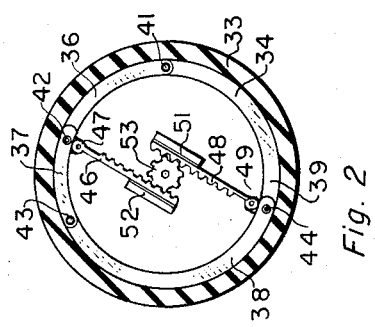
INVENTORS
ROSARIO J. PERRONE
MAURICE V. REYNOLDS
BY
*V.F. Volk*
THEIR AGENT

United States Patent Office 3,249,671
Patented May 3, 1966

3,249,671
METHOD OF SHRINKING TUBING
Rosario J. Perrone and Maurice V. Reynolds, Marion, Ind., assignors, by mesne assignments, to Anaconda Wire and Cable Company, a corporation of Delaware
Filed May 31, 1963, Ser. No. 284,651
8 Claims. (Cl. 264—209)

Our invention relates to a method of manufacturing and applying shrinkable tubing and particularly to such tubing that is shrinkable radially but not axially.

In the application of shrinkable tubing it is desirable that the tubing should experience a decrease in diameter upon shrinking, but no, or very little, decrease in length. The reason for this is that, in its intended use, the tubing is fitted over some article, such as a cable splice, which it is desired to cover snugly, and thereafter heated to cause it to shrink permanently upon the article. If, in addition to shrinking in diameter, the tubing were also to shrink in length, some portion of the article would become exposed as the tubing shrank back. Thus the heat-shrinkable tubing toward which our invention is directed is a tubing which, upon being heated, will shrink radially but not axially.

In the manufacture of heat-shrinkable tubing a tube is formed of a plastic or rubber material having the property of being stretchable at a temperature below its softening point, retaining its stretched dimensions when cool and returning to its original unstretched condition upon again being heated to some critical temperature below its softening point. The original tube may conveniently be formed by extrusion and the stretching may be accomplished by a number of means which will be discussed in detail hereinbelow.

It is a characteristic of the method of our invention that, when the tubing is stretched it is stretched both radially and axially. Some attempts have been made to accomplish the aims of my invention by stretching the tubing in such a manner that it is distended radially but not axially. While in some instance this is readily accomplished in short lengths it is not easy to do as a continuous operation, whereas our process, wherein the tubing is stretched both radially and axially, can easily and accurately be performed in the manufacture of tubing in continuous lengths. Even in short lengths, however, our method has advantages for forming shrinkable tubing from materials such as rubbers which have high tensile strength and nerve and thus are difficult to stretch radially without also stretching them axially.

In our method of making tubing shrinkable in diameter but not in length we follow the steps of heating heat shrinkable tubing to a temperature below its softening point, stretching the hot tubing both radially and axially, cooling it in the stretched condition, and heating it to a temperature sufficient to cause it to shrink axially. During this heating the tubing is restrained from shrinking radially, preferably by having inserted in it a mandrel with a cross-sectional area greater than the area of the tubing prior to stretching. This mandrel may advantageously be collapsible. We then cool the tubing in its partially preshrunk condition, insert into it an article to be covered, and heat the tubing to a temperature below its softening point so as to shrink it snugly around the article.

We have also invented the method of continuously manufacturing shrinkable tubing comprising the ordered steps of continuously extruding the tubing, passing it through cooling means to cool it to a temperature below that at which it can be shrinkably stretched, and then passing it through heating means to heat it to a temperature below its softening point. In our method the tubing is then continuously stretched both radially and axially such as by pulling it over a tapered mandrel while in the heated condition, passed through cooling means while stretched to cool it to a temperature sufficiently low so that it retains its stretched dimensions and passed over a smooth-surfaced mandrel having a cross-sectional area smaller than the inside area of the tubing. We next heat the tubing so that it shrinks down on the mandrel while shrinking axially to substantially its lengthwise dimension before it was stretched. While advancing it on the mandrel we pass it through cooling means to cool it to a temperature sufficiently low so that it retains the radial dimension of the mandrel and continuously advance it from the mandrel.

A more thorough understanding of our invention may be gained from the appended drawing.

In the drawing:

FIGURE 1 is a schematic side view of the continuous process of our invention.

FIGURE 2 is an end view of tubing on a collapsible mandrel.

FIGURE 3 is a section of a mandrel surrounded with tubing prior to shrinking.

FIGURE 4 is a section of the mandrel of FIGURE 3 after heating and shrinking the tubing.

Referring to FIGURE 1 shrinkable tubing 11 issues from an extruder 12 through a cooling means 13. The tubing 11 is comprised of a composition which can be cooled to an original dimension, then stretched at some temperature below its softening point, and again cooled in the stretched condition, with the result that when it is subsequently heated it will return to its prestretched dimensions. The cooling means 13 may be a water spray, air draft or still air passage but it should be sufficient to set up tubing 11 in the dimensions it will naturally assume from the conditions of extrusion. At this point the tubing has a natural diameter $d_1$. The tubing is then heated in an oven 14 or equivalent means to a temperature that is lower than the softening point of the composition but sufficiently high to permit the tubing to be stretched by physical means. Many compositions suitable for the process of our invention do not have sharp softening points, and soften continuously as they are heated. When we refer to softening point in this application we mean to define the temperature at which the composition in question will lose the property of elastic memory and will be so easily deformed that it will not return to its original shape after cooling and subsequent reheating. The softening point of polyvinyl chloride compositions by our definition will be about 140° C. although this will naturally vary with molecular weight and choice of plasticizer. An understanding of the operation of our process will be furthered, however, by considering that, with a polyvinylchloride composition having a softening point of 140° C., the heater 14 will raise the temperature of the tubing 11 to about 115° C.

While it is still hot, the tubing 11 is stretched by pulling it over a conical plug 16 having a diameter $d_2$ in excess of the diameter desired for the tubing in its final preshrunk condition. It will be obvious that when the tubing 11 is pulled over the plug 16 it will stretch axially as well as radially due to the axial tension necessary to force the tubing over the plug.

The plug 16 has a cylindrical portion 17 and the tubing 11 advances along the cylinder 17 while it is chilled by cooling means 18 which may be a water spray, air jet, etc. The chilling of the tubing 11 on the plug 16 sets it at an inside diameter $d_2$ which it will hold indefinitely in the chilled condition. If, at this stage of its manufacture the tubing 11 were merely cut into lengths and utilized in its intended way, i.e., fitted over an article such as an electrical splice and heated to shrink it down on the said article, shrinkage would take place axially as well as radially. Since this is undesirable it is a feature of our invention to provide further steps in the manufacture of shrinkable tubing.

In order to restrain the plug 16 from being carried forward with the tubing 11 a wire rod 19 is fastened to a tapered end 21 of the plug 16 and threaded into a core 22 cooperating with the die 12. Another wire 23 is connected to the downstream end of the plug 16 and is fastened to a cylindrical mandrel 24 having a diameter $d_3$ somewhat less than the diameter $d_2$ of the plug 16. The cooled tubing 11 is advanced over the mandrel 24 and heated in an oven or equivalent means 26 so that the tubing shrinks down upon the mandrel. The amount of radial shrinkage is, of course, limited by the diameter $d_3$ but the tubing is completely free to shrink axially to the same axial dimension it had on leaving the die 12. To further assure that there shall be no hindrance to lengthwise shrinkage of the tubing 11 on the mandrel 24 the surface of the latter is thoroughly lubricated. For this purpose hollow rods may be substituted for the wires 19 and 23 connecting with an internal channel (not shown) through the plug 16 so that lubricant might be paid into the mandrel 24 from a source upstream of the extruder core 22.

In this case, of course, the surface of the mandrel 24 will be perforated to permit the lubricant to reach the outside. As a further assurance that complete lengthwise shrinkage occurs on the mandrel 24 the tubing 11 is pushed, rather than pulled, onto the mandrel by means of caterpillars or continuous belts 27. The tubing 11 is maintained at the diameter $d_2$ through the cooling means 18 until it has safely set at that diameter. To reduce frictional resistance the diameter of the plug 16 is reduced slightly over an end portion 28 to a diameter $d_4$. In this area the tubing has been thoroughly cooled by the cooling means 18 and can be pulled by the capstans 27 without danger of further stretching. As the tubing 11 advances on the mandrel 24 after being shrunken by the heating means 26 it is cooled, while still on the mandrel, by a cooling means 29. At this point the tubing will have a diameter $d_3$ smaller than the diameter $d_2$ but significantly larger than the diameter $d_1$ so that any subsequent heating will result in further radial shrinkage. Subsequent heating will not cause any lengthwise shrinkage, however, because the tubing was fully shrunken lengthwise when heated by the heater 26. The tubing 11 is taken up by means not shown downstream of the mandrel 24. This take-up means is synchronized with the capstans 27 so as not to move the tubing faster than it is supplied by the capstans, taking into account the lengthwise shrinkage upon the mandrel 24. After leaving the mandrel 24 the tubing 11 may be stored on reels or it may be cut into short lengths and stored in that condition. In either case the tubing is eventually applied over an article such as a cable splice and heated again so that it shrinks down upon the said article.

FIGURES 3 and 4 show the method of our invention applied in a noncontinuous process. Here a tubing 31 of shrinkable material has been cut to length before being preshrunk and fitted over a smooth mandrel 32 which may be lubricated on the surface. In cases where the lengths of tubing 31 are unusually long the mandrel 32 may be formed from a hollow porous material and lubricated from the inside in a known manner. Heat is then applied to the tubing by a heating means similar to the means 26 with the result that the tubing shrinks both axially and radially to conform to the view shown in FIGURE 4 where the tubing 31 has shrunk to form a shorter length of tubing 33. Since there is no restraint to prevent axial shrinkage, the lengthwise shrinkage that takes place is complete, but the mandrel 32 is selected to have a diameter great enough so that the tubing remains stretched radially and will still be capable of further loss of diameter upon subsequent heating after being removed from the mandrel. Before removing it from the mandrel 32 the shrunken tubing 33 is cooled. This may be accomplished by means such as the cooling means 29 or merely by leaving it on the mandrel 32 a sufficient length of time at room temperature. After its removal from the mandrel 32 the tubing 33 may be stored until it is used by covering an article such as an electrical joint and heated to shrink down upon the said article. When the tubing 31 has an unusually thin wall or it is undesirable to lubricate the mandrel 32 or merely for additional facility in removing the tubing from the mandrel the latter may be collapsible as shown in FIGURE 2. There a mandrel 34 is tubular and comprised of four arcuate sections 36, 37, 38, 39 joined by means of piano hinges 41, 42, 43, 44. A rack 46 is connected to the section 37 at the hinge 42 by means of a pivot 47 and a rack 48 is connected to the section 38 at the hinge 44 by means of a pivot 49. The racks 46, 48 slide in guides 51, 52 and can be urged to collapse the mandrel 34 by turning a pinion 53.

We have invented a new and useful process for making tubing that is shrinkable radially but not axially and for our invention we desire an award of Letters Patent.

We claim:
1. The method of manufacturing tubing shrinkable in diameter while holding its lengthwise dimension unaltered comprising the steps of:
   (A) heating heat-shrinkable tubing to a temperature below its softening point,
   (B) stretching said hot tubing both radially and axially,
   (C) cooling said tubing while in its stretched condition,
   (D) heating said tubing to a temperature sufficient to cause it to shrink axially
      (a) while restraining it from shrinking radially, and
   (E) cooling said tubing in its partially preshrunk condition.
2. The method of manufacturing and applying shrinkable tubing comprising the steps of:
   (A) heating heat-shrinkable tubing to a temperature below its softening point,
   (B) stretching said hot tubing both radially and axially,
   (C) cooling said tubing while in its stretched condition,
   (D) heating said tubing to a temperature sufficient to cause it to shrink axially
      (a) while restraining it from shrinking radially,
   (E) cooling and tubing in its partially preshrunk condition,
   (F) inserting an article to be covered within said tubing, and
   (G) heating said tubing to a temperature below its softening point, thereby shrinking said tubing snugly around said article.
3. The method of manufacturing tubing shrinkable in diameter while holding its lengthwise dimension unaltered comprising the steps of:
   (A) heating heat-shrinkable tubing to a temperature below its softening point,
   (B) stretching said hot tubing both radially and axially,
   (C) cooling said tubing while in its stretched condition,
   (D) inserting a mandrel into said tubing,
      (a) said mandrel having a cross-sectional area smaller than the area of said stretched tubing but greater than the area of said tubing prior to stretching,
   (E) heating said tubing until it shrinks down upon said mandrel

(a) while shrinking axially to substantially its length before stretching,
(F) cooling said tubing on said mandrel, and
(G) removing said tubing from said mandrel.

4. The method of claim 3 wherein said mandrel is collapsible and is collapsed to remove said tubing after cooling.

5. The method of manufacturing and applying shrinkable tubing comprising of the steps of:
   (A) heating heat-shrinkable tubing to a temperature below its softening point,
   (B) stretching said hot tubing both radially and axially,
   (C) cooling said tubing while in its stretched condition,
   (D) inserting a mandrel into said tubing,
       (a) said mandrel having a cross-sectional area smaller than the area of said stretched tubing tubing but greater than the area of said tubing prior to stretching,
   (E) heating said tubing until it shrinks down upon said mandrel
       (a) while shrinking axially to substantially its length before stretching,
   (F) cooling said tubing on said mandrel,
   (G) removing said tubing from said mandrel,
   (H) inserting an article to be covered within said tubing, and
   (I) heating said tubing to a temperature below its softening point, thereby shrinking said tubing snugly around said article.

6. The method of claim 5 wherein said mandrel is collapsible and is collapsed to remove said tubing after cooling.

7. The method of continuously manufacturing shrinkable tubing comprising the ordered steps of:
   (A) continuously extruding said tubing,
   (B) passing said tubing through a cooling means thereby cooling said tubing to a temperature below that at which it can be shrinkably stretched,
   (C) passing said tubing through heating means thereby heating said tubing to a temperature below its softening point,
   (D) continuously stretching said tubing both radially and axially while in the heated condition,
   (E) passing said tubing through cooling means while in the stretched condition, thereby cooling said tubing to a temperature sufficiently low so that it retains its stretched dimensions,
   (F) continuously passing said tubing over a smooth-surfaced mandrel having a cross-sectional area smaller than the inside area of said tubing,
   (G) heating said tubing so that it shrinks down upon said mandrel while shrinking axially to substantially its lengthwise dimension before stretching,
   (H) while advancing on said mandrel passing said tubing through cooling means, thereby cooling said tubing to a temperature sufficiently low so that it retains the radial dimension of said mandrel, and
   (I) continuously advancing asid tubing from said mandrel.

8. The method of continuously manufacturing shrinkable tubing comprising the ordered steps of:
   (A) continuously extruding said tubing,
   (B) passing said tubing through a cooling means, thereby cooling said tubing to a temperature below that at which it can be shrinkably stretched,
   (C) passing said tubing through heating means thereby heating said tubing to a temperature below its softening point,
   (D) pulling said tubing over a tapered mandrel and thereby continuously stretching said tubing both radially and axially while in the heated condition,
   (E) passing said tubing through cooling means while in the stretched condition, thereby cooling said tubing to a temperature sufficiently low so that it retains its stretched dimensions,
   (F) continuously passing said tubing over a smooth-surfaced mandrel having a cross-sectional area smaller than the inside area of said tubing,
   (G) heating said tubing so that it shrinks down upon said mandrel while shrinking axially to substantially its lengthwise dimension before stretching,
   (H) while advancing on said mandrel passing said tubing through cooling means thereby cooling said tubing to a temperature sufficiently low so that it retains the radial dimension of said mandrel, and
   (I) continuously advancing said tubing from said mandrel.

References Cited by the Examiner
UNITED STATES PATENTS

| | | | |
|---|---|---|---|
| 2,027,962 | 1/1936 | Currie | 264—209 X |
| 2,716,777 | 9/1955 | Hagen | |
| 2,774,993 | 12/1956 | Hagen et al. | 264—98 |

ROBERT F. WHITE, *Primary Examiner.*

A. R. NOE, *Assistant Examiner.*